United States Patent [19]

Ishii et al.

[11] Patent Number: 5,479,615
[45] Date of Patent: Dec. 26, 1995

[54] BUFFER ASYNCHRONOUS OUTPUT APPARATUS CAPABLE OF REFERRING TO OR RENEWING A PREVIOUSLY RENEWED BUFFER AREA BY ANOTHER RENEWAL PROCESSING PROGRAM

[75] Inventors: Masanori Ishii; Masashi Omuro, both of Tokyo, Japan

[73] Assignee: NEC Corporation, Tokyo, Japan

[21] Appl. No.: 987,144

[22] Filed: Dec. 8, 1992

[30] Foreign Application Priority Data

Dec. 9, 1991 [JP] Japan .................. 3-350336

[51] Int. Cl.$^6$ .................................................. G06F 12/16
[52] U.S. Cl. ................. 395/250; 395/600; 364/DIG. 1
[58] Field of Search ............................... 395/250, 425, 395/600, 650

[56] References Cited

U.S. PATENT DOCUMENTS

| | | | |
|---|---|---|---|
| 5,043,876 | 8/1991 | Terry | 395/600 |
| 5,053,945 | 10/1991 | Whisler | 395/600 |
| 5,161,215 | 11/1992 | Kouda et al. | 395/250 |
| 5,163,148 | 11/1992 | Walls | 395/600 |
| 5,224,212 | 6/1993 | Rosenthal et al. | 395/250 |
| 5,255,387 | 10/1993 | Arnold et al. | 395/600 |
| 5,293,618 | 3/1994 | Tandai et al. | 395/650 |
| 5,317,731 | 5/1994 | Dias et al. | 395/600 |
| 5,327,551 | 7/1994 | Kaneko | 395/575 |

*Primary Examiner*—Parshotam S. Lall
*Assistant Examiner*—Viet Vu
*Attorney, Agent, or Firm*—Foley & Lardner

[57] ABSTRACT

In a buffer asynchronous output apparatus comprising a plurality of renewal processing programs each of which renews one of buffer areas in a system shared buffer unit as a renewed buffer area, a copied buffer area securing section secures a copied buffer area. A renewed buffer area copying section copies contents of the renewed buffer area into the copied buffer area. An output request enqueuing section enqueues an output request into an output request waiting queue. Performed asynchronously with the renewal processing programs, an output processing program comprises a file outputting section for outputting contents of the copied buffer area into a file device on reception of the output request dequeued from the output request waiting queue. After completion of a file output processing by means of the file outputting section, an output completion informing section stores an output completion status and a file output result status in a copied buffer information field on a buffer control table. In place of the copied buffer area securing section, an alternate copied buffer area securing section secures an alternate copied buffer area. A copied buffer area releasing section releases the copied buffer area. On ending of each of the renewal processing programs, a file output checking section checks whether or not the file output processing normally ends.

4 Claims, 6 Drawing Sheets

151 BUFFER CONTROL TABLE

220 COPIED BUFFER INFORMATION FIELD
OR
230 ALTERNATE COPIED BUFFER INFORMATION FIELD

BUFFER ASYNCHRONOUS OUTPUT APPARATUS CAPABLE OF REFERRING TO OR RENEWING A PREVIOUSLY RENEWED BUFFER AREA BY ANOTHER RENEWAL PROCESSING PROGRAM

BACKGROUND OF THE INVENTION

This invention relates to a method of carrying out a buffer output processing for a file device concurrently renewed by a plurality of renewal processing programs by using a system shared buffer unit which the renewal processing program can use in common. This invention relates also to a buffer asynchronous output apparatus for use in carrying out the method.

As well known in the art, a system shared buffer unit is interposed between a plurality of renewal processing programs and a file device. The renewal processing programs can use the system shared buffer unit in common. The file device is concurrently renewed by the renewal processing programs. The system shared buffer unit comprises a plurality of buffer areas. Attention will be directed to a case as follows. For example, after a first renewal processing program renews one of the buffer areas as a renewed buffer area, a second renewal processing program wants to refer to or renew the renewed buffer area. Under the circumstances, in prior art, the second renewal processing program can refer to or renew the renewed buffer area only after the contents of the renewed buffer area are completely outputted into the file device. In other words, it is necessary that the second renewal processing program awaits completion of file output for the renewed buffer area. As a result, such a buffer output processing system for a file device has reduced efficiency.

SUMMARY OF THE INVENTION

It is therefore an object of this invention to provide a method which is effectively capable of carrying out a buffer output processing for a file device.

It is another object of this invention to provide a method of the type described, wherein another renewal processing program can refer to or renew a previously renewed buffer area without awaiting completion of file output for the renewed buffer area.

It is still another object of this invention to provide a buffer asynchronous output apparatus which is effectively capable of carrying out a buffer output processing for a file device.

It is yet another object of this invention to provide a buffer asynchronous output apparatus of the type described, wherein another renewal processing program can refer to or renew a renewed buffer area without waiting completion of file output for the renewed buffer area.

Other objects of this invention will become clear as the description proceeds.

According to one aspect of this invention, a method carries out a buffer output processing for a file device concurrently renewed by a plurality of renewal processing programs by using a system shared buffer unit which the renewal processing programs can use in common. The system shared buffer unit comprises a plurality of buffer areas. A first one of the renewal processing programs uses a predefined one of the buffer areas as a renewed buffer area.

The the above-understood method comprises the steps of securing, by the first one of the renewal processing programs, one of remaining buffer areas except for the renewed buffer area as a copied buffer area, copying, by the first one of the renewal processing programs, contents of the renewed buffer area into the copied buffer area, and outputting, by an output processing program performed asynchronously with the renewal processing programs, contents of the copied buffer area into the file device.

According to a different aspect of this invention, it is possible to understand that a buffer asynchronous output apparatus carries out a buffer output processing for a file device concurrently renewed by a plurality of renewal processing programs by using a system shared buffer unit which the renewal processing programs can use in common. The system shared buffer unit comprises a plurality of buffer areas. Each of the renewal processing programs uses a predefined one of the buffer areas as a renewed buffer area.

According to the different aspect of this invention, the above-understood system shared buffer unit comprises a buffer control table for controlling the renewed buffer area and a copied buffer area into which contents of the renewed buffer area are copied. The buffer control table comprises a renewed buffer information field for storing renewed buffer information for the renewed buffer area and a copied buffer information field for storing copied buffer information for the copied buffer area. The copied buffer information field comprises an area information field for the copied buffer area, an output status field for storing an output status, a file output result status field for storing a file output result status, and a renewal processing program identifier field for storing a renewal processing program identifier identifying one of the renewal processing programs. Each of the renewal processing programs comprises a copied buffer area securing section for checking the renewed buffer information field and the copied buffer information field on the buffer control table to determine whether or not the copied buffer area corresponding to the renewed buffer area in question is already secured. The copied buffer area securing section secures the copied buffer area and stores the copied buffer information in the copied buffer information field of the buffer control table when the copied buffer area is not still secured. A renewed buffer area copying section copies contents of the renewed buffer area into the copied buffer area. The renewed buffer area copying section stored the renewal processing program identifier in the renewal processing program identifier field of the copied buffer information field on the buffer control table that corresponds to the copied buffer area.

Preferably, the buffer asynchronous output apparatus may comprise an output request waiting queue for storing an output request to output contents of the copied buffer area into the file device. Each of the renewal processing programs further comprises an output request enqueuing section for storing an output request status as the output status in the output status field of the copied buffer information field on the buffer control table and enqueuing the output request in the output request waiting queue when the output request status is not still stored in the output status field of the copied buffer information field on the buffer control table. The buffer asynchronous output apparatus comprises an output processing program which is performed asynchronously with the renewal processing programs. The output processing program comprises a file outputting section for storing an output execution status as the output status in the output status field of the copied buffer information field on the buffer control table and outputting contents of the copied buffer area into the file device when the output processing program receives the output request dequeued from the output request waiting queue. An output completion informing section stores an output completion status as the output status in the output status field of the copied buffer information field on the buffer control table and stores a file output result status in the file output result status field of the copied buffer information field on the buffer control table after completion of a file output processing by means of the file outputting section.

Desirably, the buffer control table further may control an alternate copied buffer area into which contents of the renewed buffer area should be copied in place of the copied buffer area. The buffer control table further comprises an alternate copied buffer information field for storing alternate copied buffer information for the alternate copied buffer area. The alternate copied buffer information field comprises an area information field for the alternate copied buffer area, another output status field for storing another output status, another file output result status field for storing another file output result status, and another renewal processing program identifier field for storing another renewal processing program identifier identifying another of the renewal processing programs. Each of the renewal processing programs further comprises an alternate copied buffer area securing section for checking the buffer control table to determine whether or not the alternate copied buffer area information field is secured in the buffer control table when the output execution status is stored in the output status field of the copied buffer information field on the buffer control table. The alternate copied buffer area securing section secures the alternate copied buffer area and stores the alternate copied buffer information in the alternate copied buffer information field on the buffer control table when the alternate copied buffer area is not secured in the system shared buffer unit. The alternate copied buffer area securing section checks the output status field of the alternate copied buffer information field when the alternate copied buffer area is already secured in the system shared buffer unit. The alternate copied buffer area securing section secures the alternate copied buffer area and stores the alternate copied buffer information in the alternate copied buffer information field of the buffer control table when the output execution status is stored in the output status field of the alternate copied buffer information field on the buffer control table.

The output processing program further may comprise an output request re-enqueuing section for checking whether or not the output execution status is stored in the output status field of the copied buffer information field corresponding to the alternate copied buffer information field when the output processing program receives the output request for the alternate copied buffer area from the output request waiting queue. The output request re-enqueuing section enqueues the received output request in the output request waiting queue again when the output execution status is stored in the output status field of the copied buffer information field corresponding to the alternate copied buffer information field.

Each of the renewal processing program further may comprise a copied buffer area releasing section for checking whether the alternate copied buffer information is present or absent in the alternate copied buffer information field on the buffer control table when the output completion status is stored in the output status field of the copied buffer information field on the buffer control table. When the alternate copied buffer information is present in the alternate copied buffer information field on the buffer control table, the copied buffer area releasing section releases the copied buffer area, exchanges the copied buffer information field and the alternate copied buffer information field so that the copied buffer information in the copied buffer information field on the buffer control table can control the alternate copied buffer area, and then cancels the alternate copied buffer information in the alternate copied buffer information field. When the alternate copied buffer information is absent in the alternate copied buffer information field on the buffer control table and when the file output processing normally ends by checking the file output result status field corresponding to the copied buffer area, the copied buffer area releasing section releases the copied buffer area and cancels the copied buffer information in the copied buffer information field on the buffer control table. On ending of each of the renewal processing programs, a file output checking section retrieves the renewal processing program identifier in the renewal processing program identifier field on the buffer control table to check whether the copied buffer area or the alternate copied buffer area renewed by each of the renewal processing programs is present or absent. The file output checking section judges that the file output result normally ends when the copied buffer area or the alternate copied buffer area renewed by each of the renewal processing programs is absent. When the copied buffer area or the alternate copied buffer area renewed by each of the renewal processing programs is present, the file output checking section judges whether or not the file output result normally ends by checking the file output result status field after waiting of output completion for all of the copied buffer area and the alternate copied buffer area corresponding to the renewed buffer area.

DESCRIPTION OF THE PREFERRED EMBODIMENTS

Figure 1:
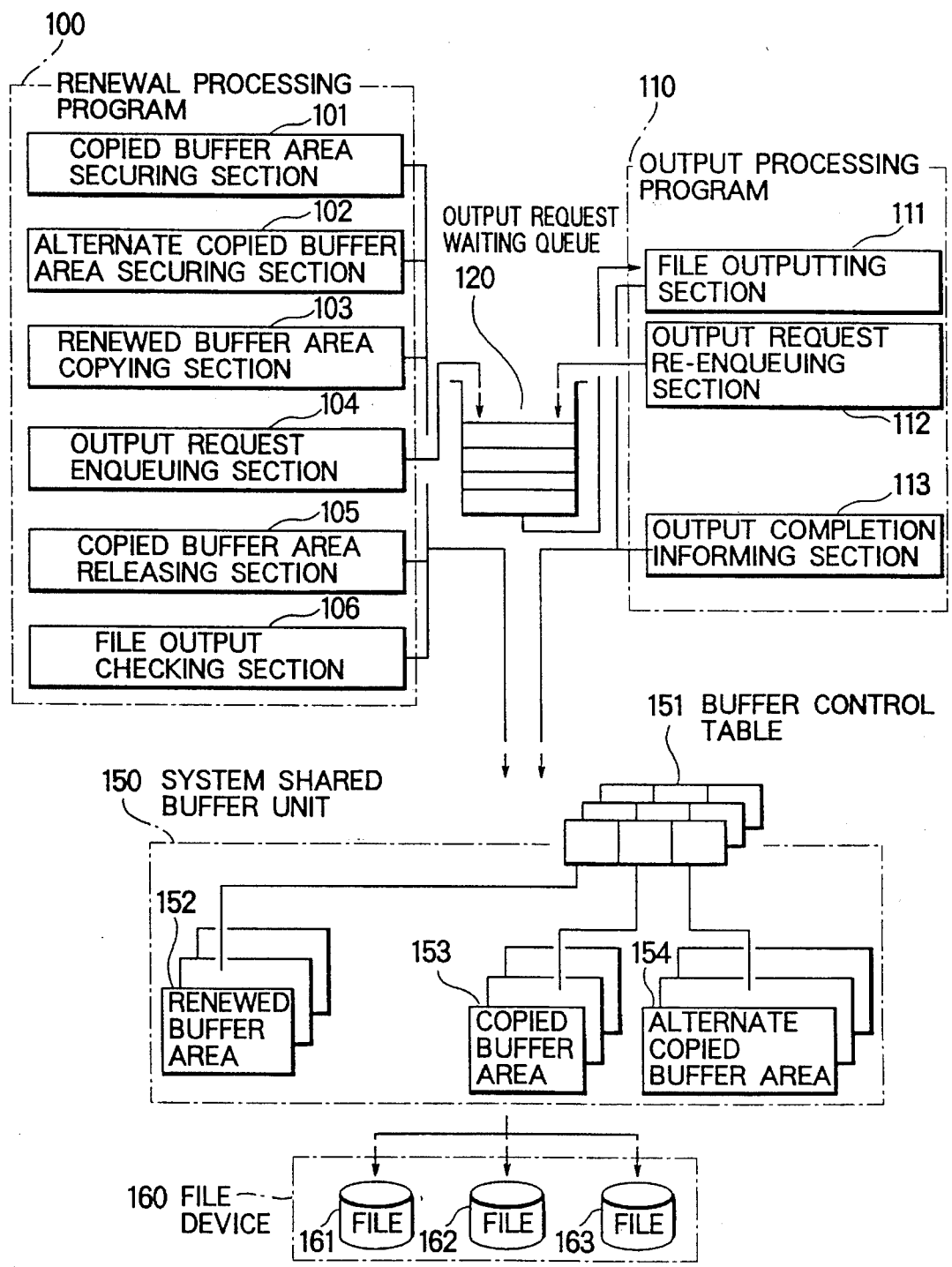
FIG. 1 is a block diagram of a buffer asynchronous output apparatus for use in carrying out a method according to an embodiment of this invention.

Referring to FIG. 1, a buffer asynchronous output apparatus according to an embodiment of this invention comprises a plurality of renewal processing programs (only one of them is shown in FIG. 1 and is depicted as 100), an output processing program 110, an output request waiting queue 120, a system shared buffer unit 150, and a file device 160.

The illustrated buffer asynchronous output apparatus carries out a buffer output processing for the file device 160 concurrently renewed by the renewal processing programs by using the system shared buffer unit 150. The renewal processing programs can use the system shared buffer unit 150 in common. The system shared buffer unit 150 comprises a plurality of buffer areas as shown in FIG. 1. Each of the renewal processing programs uses one of the buffer areas as a renewed buffer area in the manner which will later become clear.

The renewal processing program 100 comprises a copied buffer area securing section 101, an alternate copied buffer area securing section 102, a renewed buffer area copying section 103, an output request enqueuing section 104, a copied buffer area releasing section 105, and a file output checking section 106. The output processing program 110 is performed asynchronously with the renewal processing programs. The output processing program 110 comprises a file outputting section 111, an output request re-enqueuing section 112, and an output completion informing section 113.

The system shared buffer unit 150 is accessed by the renewal processing program 100 and the output processing program 110 and is connected to the file device 160. The system shared buffer unit 150 comprises buffer control tables 151 for controlling renewed buffer areas 152 used by the renewal processing programs, copied buffer areas 153 into which contents of the renewed buffer areas 152 are copied, and alternate copied buffer areas 154 into which contents of the renewed buffer areas 152 are copied in place of the copied buffer areas 153.

The file device 160 comprises a plurality of files. In the example being illustrated, the file device 160 comprises three files 161, 162, and 163.

Figure 2:
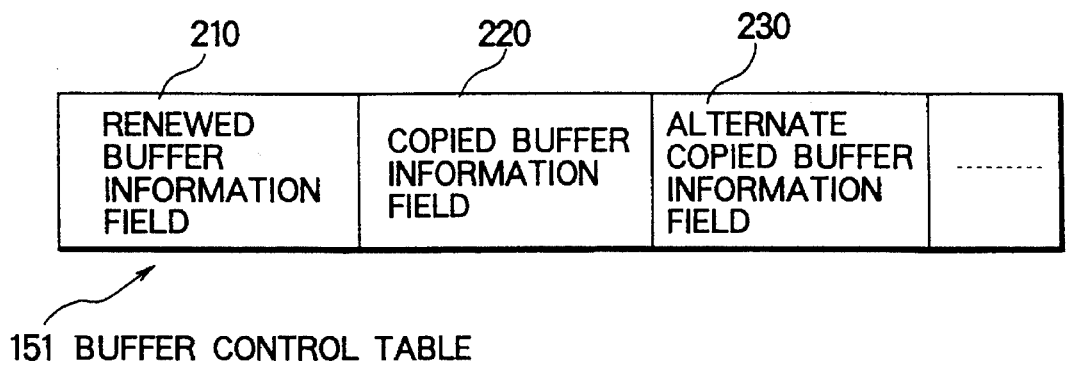
FIG. 2 shows a format of a buffer control table of a system shared buffer unit for use in the buffer asynchronous output apparatus illustrated in FIG. 1.

Turning to FIG. 2, each buffer control table 151 comprises a renewed buffer information field 210 for storing renewed buffer information, a copied buffer information field 220 for storing copied buffer information, and an alternate copied buffer information field 230 for storing alternate copied buffer information.

Figure 3:
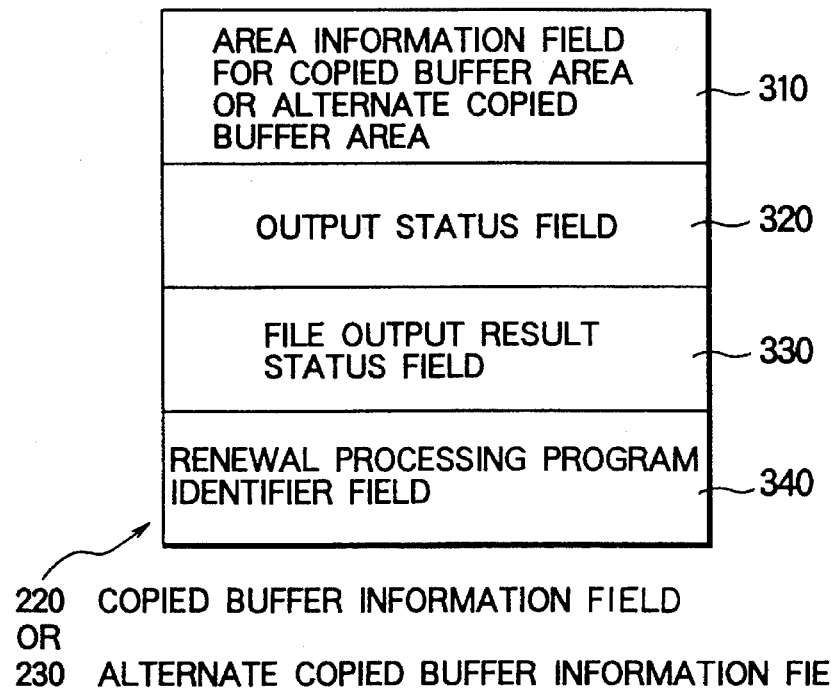
FIG. 3 shows a format of a copied buffer information field or an alternate copied buffer information field in the buffer control table shown in FIG. 2.

Turning to FIG. 3, each of the copied buffer information field 220 and the alternate copied buffer information field 230 comprises an area information field 310 for the copied buffer area 153 or the alternate copied buffer area 154, an output status field 320 for storing an output status, a file output result status field 330 for storing a file output result status, and a renewal processing program identifier field 340 for a renewal processing program identifier. In the manner which will later be described in detail, the output status field 320 stores as the output status, one selected from an output execution status indicating execution of file output of the copied buffer areas 153 or the alternate copied buffer area 154, an output request status indicating a pending output request for the file device 160, an output completion status indicating that the file output processing has completed, and a releasable status indicating that the copied buffer area or the alternate copied buffer area can be released.

Turning back to FIG. 1, the copied buffer area securing section 101 checks the renewed buffer information field 210 and the copied buffer information field 220 on the buffer control table 151 to determine whether or not the copied buffer area 153 corresponding to the renewed buffer area 152 is already secured or reserved. When the copied buffer area 153 in question is not still secured or reserved, the copied buffer area securing section 101 secures or reserves the copied buffer area 153 and stores the copied buffer information in the copied buffer information field 220 of the buffer control table 151.

The alternate copied buffer area securing section 102 checks the buffer control table 151 to determine whether or not the alternate copied buffer information field is secured or reserved when the output status field 320 corresponding to the copied buffer area 153 stores the output execution status. When the alternate copied buffer area is not still secured or reserved, the alternate copied buffer area securing section 102 secures or reserves the alternate copied buffer area 154 and stores the alternate copied buffer information in the alternate copied buffer information field 230 of the buffer control table 151. When the alternate copied buffer area 154 is already secured, the alternate copied buffer area securing section 102 checks the output status field 320 of the alternate copied buffer information field 230 corresponding to the alternate copied buffer area 154. When the output status field 320 of the alternate copied buffer information field 230 stores the output execution status, the alternate copied buffer area securing section 102 secures or reserves the alternate copied buffer area 154 and stores the alternate copied buffer information in the alternate copied buffer information field 230 of the buffer control table 151.

When the copied buffer area 153 is secured by the copied buffer area securing section 101, the renewed buffer area copying section 103 copies contents of the renewed buffer area 152 into the copied buffer area 153. Subsequently, the renewed buffer area copying section 103 stores the renewal processing program identifier for identifying the renewal processing program 100 in the renewal processing program identifier field 340 of the copied buffer information field 220 on the buffer control table 151 that corresponds to the copied buffer area 153.

Similarly, the renewed buffer area copying section 103 copies contents of the renewed buffer area 152 into the alternate copied buffer area 154 when the alternate copied buffer area 154 is secured by the alternate copied buffer area securing section 102. Subsequently, the renewed buffer area copying section 103 stores the renewal processing program identifier in the renewal processing program identifier field 340 of the alternate copied buffer information field 230 on the buffer control table 151 that corresponds to the alternate copied buffer area 153.

Once the contents of the renewed buffer area 152 are copied into the copied buffer area 153 or the alternate copied buffer area 154, another renewal processing program can refer to or renew the renewed buffer area 152. In other words, the other renewal processing program can refer to or renew the renewed buffer area 152 without waiting completion of file output for the renewed buffer area 152.

The output request enqueuing section 104 stores the output request status in the output status field 320 and then enqueues an output request into the output request waiting queue 120. The output request is a request for outputting contents of the copied buffer area 153 or the alternate copied buffer area 154 into the file device 160.

When the output processing program 110 receives the output request dequeued from the output request waiting queue 120, the file outputting section 111 stores the output execution status in the output status field 320 of the copied buffer information field 220 or the alternate copied buffer information field 230 which correspond to the copied buffer area 153 or the alternate copied buffer area 154. Subsequently, the file outputting section 111 outputs contents of the copied buffer area 153 or the alternate copied buffer area 154 into a desired one of the files 161 to 163 in the file device 160.

When the output processing program 110 receives the output request for the alternate copied buffer area 154 that is dequeued from the output request waiting queue 120, the output request re-enqueuing section 112 checks whether or not the output execution status is stored in the output status field 320 for the copied buffer area 153 which corresponds to the alternate copied buffer area 154 in order to avoid redundant output request to the file device 160 for the same buffer area. When the output execution status is stored in the output status field 320 for the copied buffer area 153 which corresponds to the alternate copied buffer area 154, the output request re-enqueuing section 112 enqueues the received output request into the output request waiting queue 120 again. It is therefore possible to prevent redundancy of the output request to the same buffer area and securing of a plurality of alternate copied buffer areas by the alternate copied buffer area securing section 102.

After completion of the buffer output processing for the file device 160 by means of the file outputting section 111, the output completion informing section 113 stores the output completion status and the file output result status in the output status field 320 and the file output result status field 330 of the copied buffer information field 220 that correspond to the copied buffer area 153 where the file output completes.

When the renewal processing program 100 detects the output completion status stored by the output completion informing section 113, the copied buffer area releasing section 105 checks whether the alternate copied buffer information is present or absent in the alternate copied buffer information field 230 of the buffer control table 151. When the copied buffer area releasing section 105 judges that the alternate copied buffer information is present, the copied buffer area releasing section 105 releases the copied buffer area 153, exchanges the copied buffer information and the alternate copied buffer information so that the copied buffer information on the buffer control table 151 can control the alternate copied buffer area 154, and then cancels the alternate copied buffer information. When the copied buffer area releasing section 105 judges that the alternate copied buffer information is absent, the copied buffer area releasing section 105 checks the file output result status field 330 corresponding to the copied buffer area 153. When the copied buffer area releasing section 105 judges that the file output normally ends, the copied buffer area releasing section 105 releases the copied buffer area 153 and cancels the copied buffer information on the buffer control table 151.

On ending of the renewal processing program 100, the file output checking section 106 retrieves the renewal processing program identifier on the renewal processing program identifier field 340 of the buffer control table 151 to check whether the copied buffer area 153 or the alternate copied buffer area 154 renewed by the renewal processing programs is present or absent. When the file output checking section 106 judges that the copied buffer area 153 or the alternate copied buffer area 154 renewed by the renewal processing programs is absent, the file output checking section 106 judges that file output result normally ends. When the file output checking section 106 judges that the copied buffer area 153 or the alternate copied buffer area 154 renewed by the renewal processing programs is present, the file output checking section 106 judges whether or not the file output result normally ends by checking the file output result status field 330 after waiting of output completion for all of the copied buffer area 153 and the alternate copied buffer area 154 corresponding to the renewed buffer area 152.

In consideration of renewing the same buffer area again, the copied buffer area releasing section 105 may store the releasable status in the output status field 320 corresponding to the copied buffer area 153 or the alternate copied area 154 when the copied buffer area releasing section 105 judges that the copied buffer area 153 or the alternate copied buffer area 154 can be released. If the alternate copied buffer information is present on the same buffer control table 151, the copied buffer area releasing section 105 may change the copied buffer information and the alternate copied buffer information on the buffer control table 151 to exchange the alternate copied buffer area 154 for the copied buffer area 153. It is therefore possible to reuse the copied buffer area 153.

On securing the copied buffer area 153, if any released buffer area is absent in the system shared buffer unit 150, the copied buffer area securing section 101 may check the output status field 320 on the buffer control table 151. The copied buffer area securing section 101 may release, as the released buffer area, the copied buffer area 153 or the alternate copied buffer area 154 corresponding to the output status field 320 storing the releasable status and then use the released buffer area as a new copied buffer area to be secured.

Likewise, the alternate copied buffer area securing section 102 may check the output status field 320 on the buffer control table 151 if the released buffer area is absent in the system shared buffer unit 150 on securing the alternate copied buffer area. The alternate copied buffer area securing section 102 may release, as a released buffer area, the copied buffer area or the alternate copied buffer area corresponding to the output status field 320 storing the releasable status and then use the released buffer area as a new alternate copied buffer area to be secured.

Operation of the buffer asynchronous output apparatus of FIG. 1 will be described below with reference to FIGS. 4, 5, 6, 7, and 8.

Figure 4:
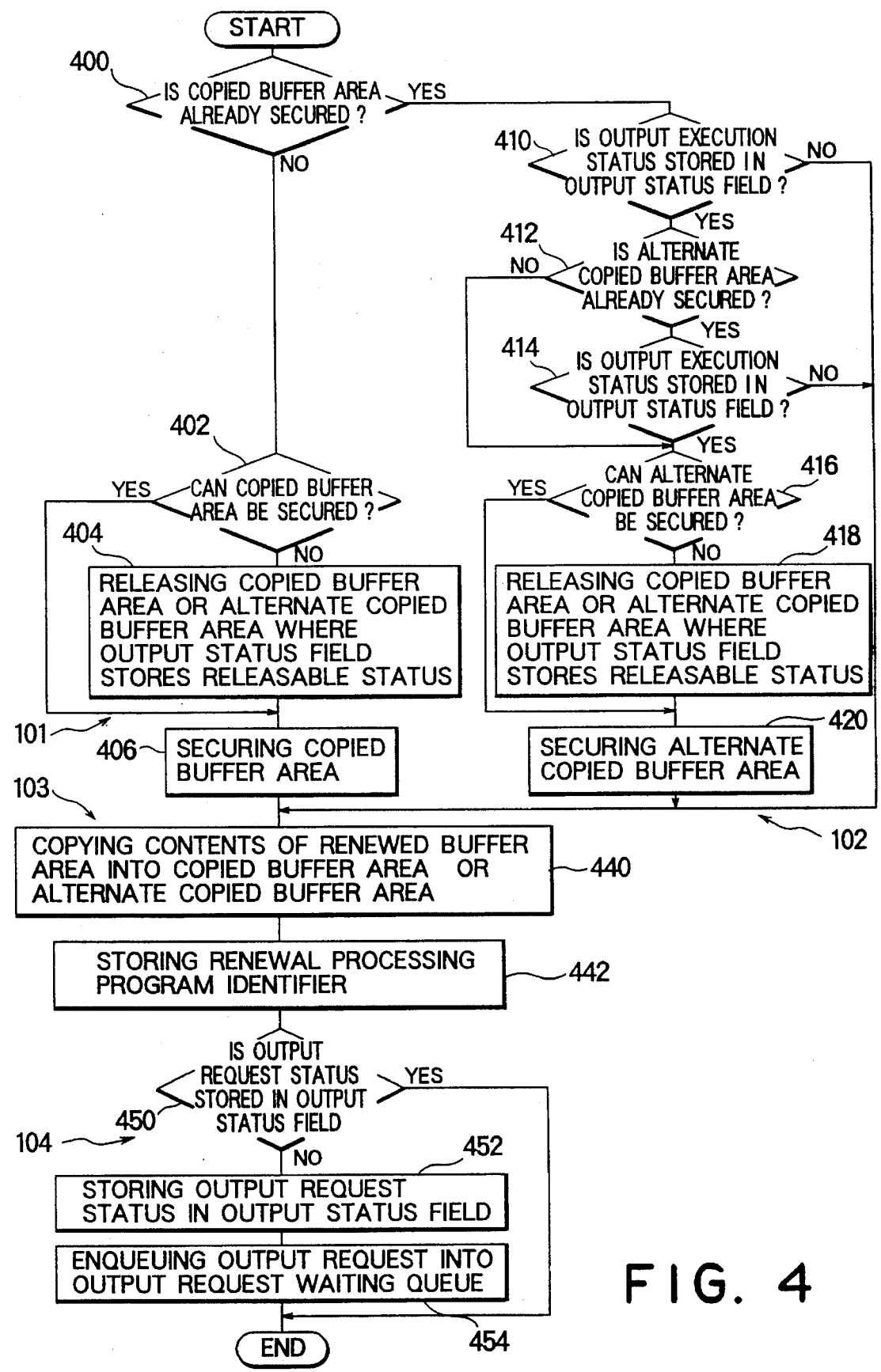
FIG. 4 is a flow chart for use in describing operation of a copied buffer area securing section, an alternate copied buffer area securing section, a renewed buffer area copying section, and an output request enqueuing section which are used in the buffer asynchronous output apparatus.

Referring to FIG. 4, the renewal processing program 100 passes control to the copied buffer area securing section 101 when the renewal processing program 100 completes renewal for the renewed buffer area 152 on the system shared buffer unit 150.

The copied buffer area securing section 101 checks the area information field 310 for the copied buffer area on the copied buffer information field 220 on the buffer control table 151 to judge whether or not the copied buffer area 153 corresponding to the renewed buffer area 152 is already secured or reserved (step 400). When the copied buffer area securing section 101 judges that the copied buffer area 153 is not still secured or reserved, the step 400 proceeds to a step 402 at which the copied buffer area securing section 101 judges whether or not the copied buffer area 153 can be secured or reserved on the system shared buffer unit 150.

When the copied buffer area securing section 101 judges that the copied buffer area 153 can not be secured or reserved on the system shared buffer unit 150, the step 402 is followed by a step 404 at which the copied buffer area securing section 101 retrieves and releases the copied buffer area 153 or the alternate copied buffer area 154 where the releasable status is stored in the output status field 320 in the copied buffer information field 220 and the alternate copied buffer information field 230 on the buffer control table 151.

When the copied buffer area securing section 101 judges that the copied buffer area 153 can be secured or reserved on the system shared buffer unit 150, the step 402 is succeeded by a step 406 which also follows the step 404 when another copied buffer area 153 or another alternate copied buffer area 154 is released. At the step 406, the copied buffer area securing section 101 secures or reserves the copied buffer area 153 on the system shared buffer unit 150 and then stores the area information for the copied buffer area in the area information field 310 for the copied buffer area of the copied buffer information field 220. Subsequently, the copied buffer area securing section 101 passes control to the renewed buffer area copying section 103.

When the copied buffer area securing section 101 judges that the copied buffer area 153 is already secured or reserved, the copied buffer area securing section 101 passes control to the alternate copied buffer area securing section 102. The alternate copied buffer area securing section 102 decides whether or not the output execution status is stored in the output status field 320 of the copied buffer information field 220 corresponding to the copied buffer area 153 (step 410). When the alternate copied buffer area securing section 102 decides that the output execution status is not stored in the output status field 320, the alternate copied buffer area securing section 102 passes control to the renewed buffer area copying section 103.

When the alternate copied buffer area securing section 102 decides that the output execution status is stored in the output status field 320, the step 410 proceeds to a step 412 at which the alternate copied buffer area securing section 102 checks the alternate copied buffer information field 230 on the buffer control table 151 to judge whether or not the alternate copied buffer area 154 is already secured or reserved on the system shared buffer unit 150.

When the alternate copied buffer area securing section 102 judges that alternate copied buffer area 154 is secured or reserved on the system shared buffer unit 150, the step 412 is followed by a step 414 at which the alternate copied buffer area securing section 102 decides whether or not the output execution status is stored in the output status field 320 of the alternate copied buffer information field 230 corresponding to the alternate copied buffer area 154. When the alternate copied buffer area securing section 102 decides that the output execution status is not stored in the output status field 320, the alternate copied buffer area securing section 102 passes control to the renewed buffer area copying section 103.

When the alternate copied buffer area securing section 102 decides that the output execution status is stored in the output status field 320, the step 414 is succeeded by a step 416 which also follows the step 412 when the alternate copied buffer area securing section 102 judges that alternate copied buffer area 154 is not secured or reserved on the system shared buffer unit 150. At the step 416, the alternate copied buffer area securing section 102 judges whether or not the alternate copied buffer area 154 can be secured or reserved on the system shared buffer unit 150.

When the alternate copied buffer area securing section 102 judges that the alternate copied buffer area 154 can not be secured on the system shared buffer unit 150, the step 416 is followed by a step 418 at which point the alternate copied buffer area securing section 102 retrieves and releases the copied buffer area 153 or the alternate copied buffer area 154 based on the releasable status is stored in the output status field 320 in the copied buffer information field 220 and the alternate copied buffer information field 230 on the buffer control table 151.

When the alternate copied buffer area securing section 102 judges that the alternate copied buffer area 154 can be secured on the system shared buffer unit 150, the step 416 is succeeded by a step 420 which also follows the step 418 when another copied buffer area 153 or another alternate copied buffer area 154 is released. At the step 420, the alternate copied buffer area securing section 102 secures or reserves the alternate copied buffer area 154 on the system shared buffer unit 150 and then stores the area information for the alternate copied buffer area in the area information field 310 for the alternate copied buffer area of the alternate copied buffer information field 230. Subsequently, the alternate copied buffer area securing section 102 passes control to the renewed buffer area copying section 103.

The renewed buffer area copying section 103 copies contents of the renewed buffer area 152 into the secured copied buffer area 153 or the secured alternate copied buffer area 154 (step 440).

The step 440 proceeds to a step 442 at which the renewed buffer area copying section 103 stores the renewal processing program identifier in the renewal processing program identifier field 340 of the copied buffer information field 220 or the alternate copied buffer information field 230. Subsequently, the renewed buffer area copying section 103 passes control to the output request enqueuing section 104.

The output request enqueuing section 104 judges whether or not the output request status is stored in the output status field 320 (step 450). When the output request status is already stored in the output status area 320, the output request enqueuing section 104 ends its processing without enqueuing the output request into the output request waiting queue 120. This is because the output request is already enqueued into the output request waiting queue 120. When the output request status is not yet stored in the output status field 320, the step 450 proceeds to a step 452 at which the output request enqueuing section 104 stores the output request status in the output status field 320. The step 452 is followed by a step 454 at which the output request enqueuing section 104 enqueues the output request for the copied buffer area 153 or the alternate copied buffer area 154 into the output request waiting queue 120. The output request enqueuing section 104 then ends its processing.

Figure 5:
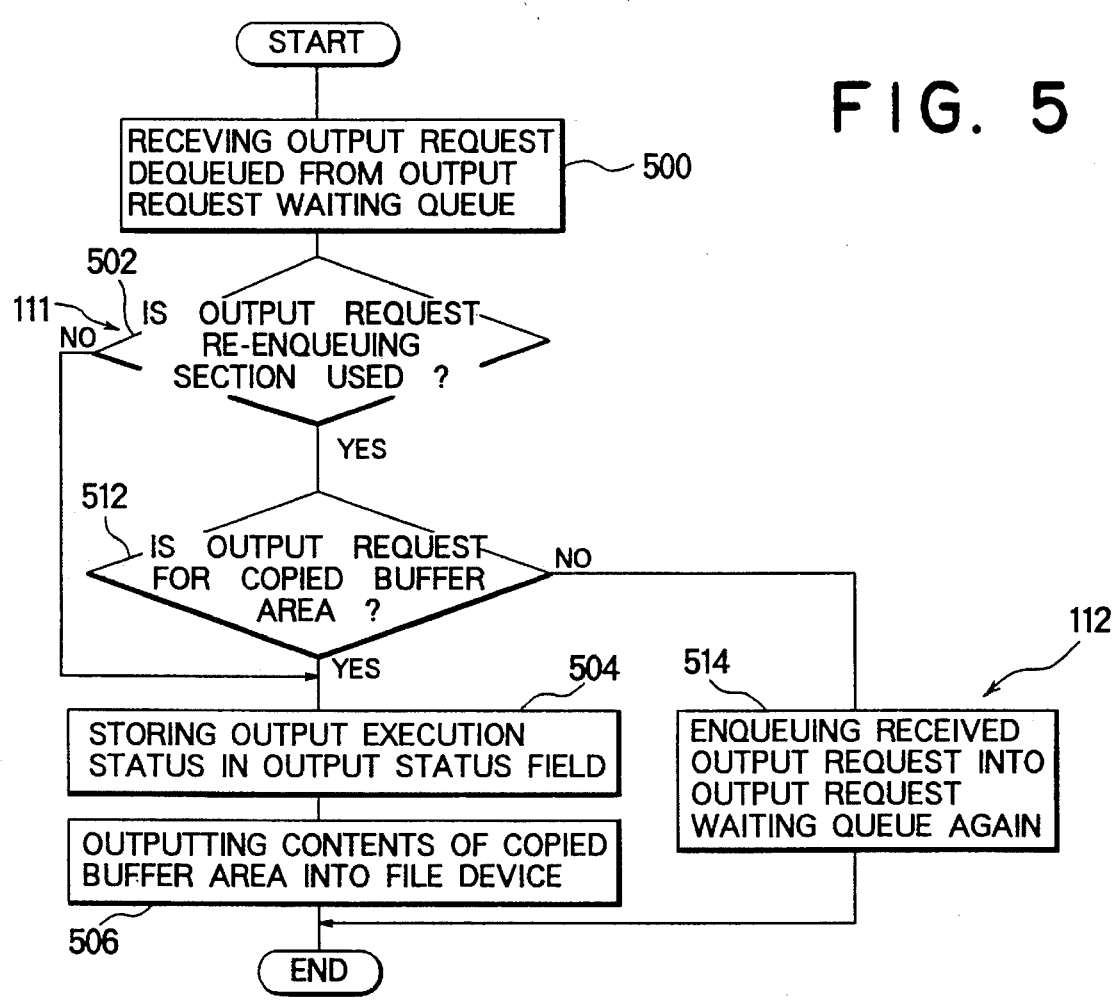
FIG. 5 is a flow chart for use in describing operation of a file outputting section and an output request re-enqueuing section which are used in the buffer asynchronous output apparatus.

Referring to FIG. 5, when the output processing program 110 receives the output request dequeued from the output request waiting queue 120 (step 500), the file outputting section 111 determines whether or not the output request re-enqueuing section 112 is used (step 502). When the file outputting section 111 determines that the output request re-enqueuing section 112 is used, the file outputting section 111 passes control to the output request re-enqueuing section 112. The output request re-enqueuing section 112 checks whether or not the dequeued output request is an output request for the copied buffer area 153 (step 512). When the output request re-enqueuing section 112 judges that the dequeued output request is not the output request for the copied buffer area 153, the step 512 proceeds to a step 514 at which point the output request re-enqueuing section 112 enqueues or registers the received output request into the output request waiting queue 120 again in order to prevent redundant output request for the same buffer area. This is because contents of the copied buffer area 153 is not outputted to the file device 160.

When the file outputting section 111 determines that the output request re-enqueuing section 112 is not used, the step 502 is succeeded by a step 504 which follows the step 512 when the output request re-enqueuing section 112 judges that the dequeued output request is the output request for the copied buffer area 153. Such judgment indicates that the output request is not made for the same buffer area. At the step 504, the file outputting section 111 stores the output execution status in the output status field 320. The step 504 proceeds to a step 506 at which point the file outputting section 111 outputs contents of the copied buffer area 153 into the file device 160.

Figure 6:
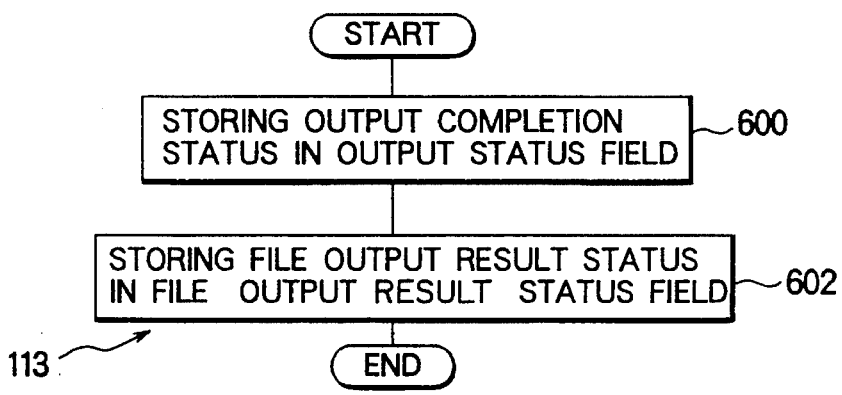
FIG. 6 is a flow chart for use in describing operation of an output completion informing section used in the buffer asynchronous output apparatus.

Turning to FIG. 6, when the file outputting processing ends by the output processing program 110, the output completion informing section 113 stores the output completion status in the output status field 320 of the copied buffer information field 220 or the alternate copied buffer information field 230 (step 600). The step 600 is followed by a step 602 at which the output completion informing section 113 stores the file output result status in the file output result status field 330.

Figure 7:
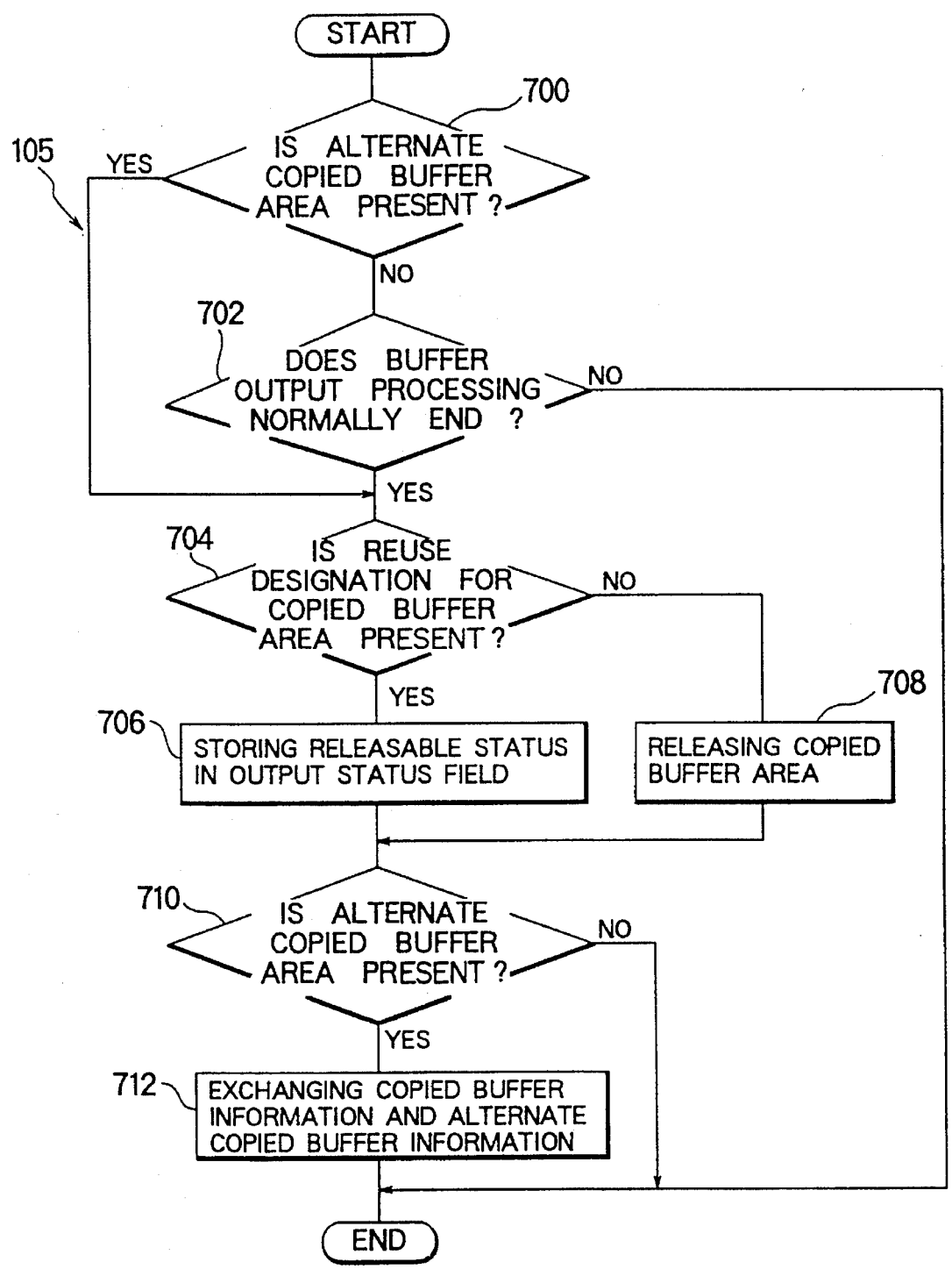
FIG. 7 is a flow chart for use in describing operation of a copied buffer area releasing section used in the buffer asynchronous output apparatus.

Turning to FIG. 7, after the output completion status is stored in the output status field 320 by the output completion informing section 113, the copied buffer area releasing section 105 checks whether the alternate copied buffer area 154 corresponding to the copied buffer area 153 where output completes is present or absent (step 700). When the copied buffer area releasing section 105 judges that the alternate copied buffer area 154 is absent, the step 700 is followed by a step 702 at which the copied buffer area releasing section 105 checks the file output result status stored in the file output result status field 330 to decide whether or not the buffer output processing for the file device 160 normally ends.

When the copied buffer area releasing section 105 decides that the buffer output processing for the file device 160 abnormally ends, the copied buffer area releasing section 105 ends its processing. When the copied buffer area releasing section 105 decides that the buffer output processing for the file device 160 normally ends, the step 702 is succeeded by a step 704. The step 704 follows the step 700 when the copied buffer area releasing section 105 judges that the alternate copied buffer area 154 is present. At the step 704, the copied buffer area releasing section 105 judges whether reuse designation for the copied buffer area 153 is present or absent. When the copied buffer area releasing section 105 judges that the reuse designation for the copied buffer area 153 is present, the step 704 proceeds to a step 706 at which point the copied buffer area releasing section 105 stores the releasable status in the output status field 320 corresponding to the copied buffer area 153. When the copied buffer area releasing section 105 judges that the reuse designation for the copied buffer area 153 is absent, the step 704 is followed by a step 708 at which point the copies buffer area releasing section 105 cancels the copied buffer information field 220 to release the copied buffer area 153.

The step 708 is succeeded by a step 710 which follows the step 706. At the step 710, the copied buffer area releasing section 105 decides whether the alternate copied buffer area 154 is present or absent. When the copied buffer area releasing section 105 decides that the alternate copied buffer area 154 is present, the step 710 proceeds to a step 712 at which point the copied buffer area releasing section 105 exchanges the copied buffer information and the alternate copied buffer information to change the alternate copied buffer area 154 into the copied buffer area 153. The copied buffer area releasing section 105 then ends its processing.

Figure 8:
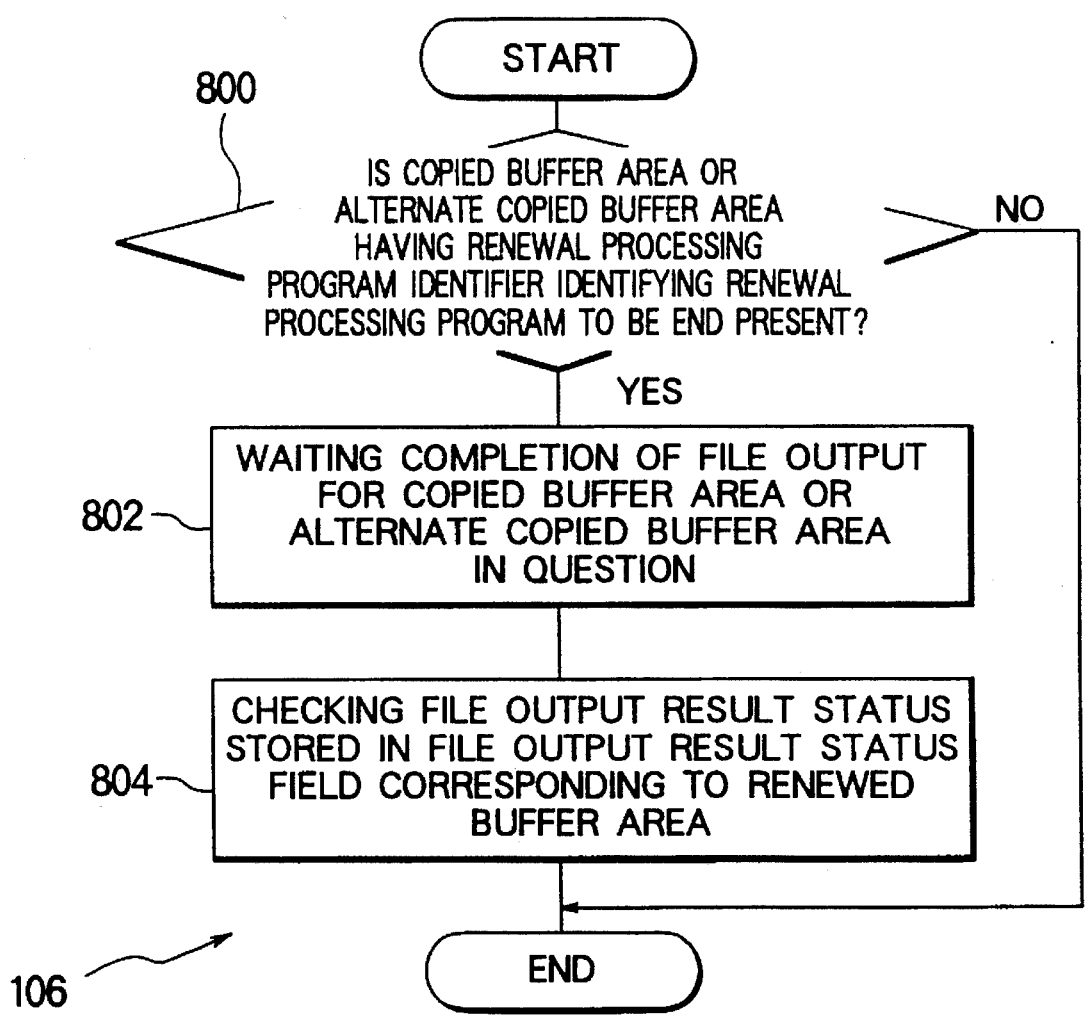
FIG. 8 is a flow chart for use in describing operation of a file output checking section used in the buffer asynchronous output apparatus.

Turning to FIG. 8, when the renewal processing program 100 ends all of the renewal processing, the file output checking section 106 retrieves the renewal processing program identifier fields 340 on all of the buffer control table 151 to check whether or not the same renewal processing program identifier identifying the renewal processing program 100 to be end is present or absent in the renewal processing program identifier fields 340 (step 800). When the file output checking section 106 determines that the same renewal processing program identifier identifying the renewal processing program 100 to be end is absent, the file output checking section 106 ends its processing. This is because outputs to all of the files normally end. When the file output checking section 106 determines that the same renewal processing program identifier identifying the renewal processing program 100 to be end is present, the step 800 proceeds to a step 802 at which the file output checking section 106 waits completion of the file output to the file device 160 from the copied buffer area 153 or the alternate copied buffer area 154 in question. The step 802 is succeeded by a step 804 at which the file output checking section 106 checks the file output result status stored in the file output result status field 330 corresponding to the renewed buffer area 152. The file output checking section 106 then ends its processing.

While this invention has thus far been described in conjunction with a preferred embodiments thereof, it will now be readily possible for those skilled in the art to put this invention into practice in various other manners. For example, the alternate copied buffer area securing section 102 may be omitted. In addition, the output request re-enqueuing section 112 may be omitted. Furthermore, from the copied buffer area releasing section 105 may be omitted the steps 704 and 706 in FIG. 7. In this event, the steps 404 and 418 in FIG. 4 may be omitted from the copied buffer area securing section 101 and the alternate copied buffer area securing section 102.

What is claimed is:

1. A buffer asynchronous output apparatus for carrying out a buffer output processing for a file device concurrently renewed by a plurality of renewal processing programs, the buffer asynchronous output apparatus comprising:

a system shared buffer unit which said renewal processing programs can use in common, said system shared buffer unit including
  a plurality of buffer areas, each of said renewal processing programs using a predefined one of said buffer areas as a renewed buffer area; and
  a buffer control table for controlling said renewed buffer area and a copied buffer area into which contents of said renewed buffer area should be copied, said buffer control table comprising a renewed buffer information field for storing renewed buffer information for said renewed buffer area and a copied buffer information field for storing copied buffer information for said copied buffer area, said copied buffer information field comprising an area information field for said copied buffer area, an output status field for storing an output status, a file output result status field for storing a file output result status, and a renewal processing program identifier field for storing a renewal processing program identifier identifying one of said renewal processing programs;

each of said renewal processing programs including
  a copied buffer area securing section for checking said renewed buffer information field and said copied buffer information field on said buffer control table to determine whether or not the copied buffer area corresponding to said renewed buffer area in question is already secured, said copied buffer area securing section securing said copied buffer area and storing said copied buffer information in said copied buffer information field of said buffer control table when said copied buffer area is not still secured, and a renewed buffer area copying section for copying contents of said renewed buffer area into said copied buffer area, said renewed buffer area copying section storing said renewal processing program identifier in said renewal processing program identifier field of said copied buffer information field on said buffer control table that corresponds to said copied buffer area, said copying contents of said renewed buffer area into said copied buffer area allowing access to said renewed buffer area by another renewal processing program prior to completion of file output for contents of said renewed buffer area;

an output request waiting queue for storing an output request which request to output contents of said copied buffer area in to said file device, each of said renewal processing programs further including an output request enqueuing section for storing an output request status as said output status in said output status field of said copied buffer information field on said buffer control table and enqueuing said output request into said output request waiting queue when said output request status is not still stored in said output status field of said copied buffer information on said buffer control table; and an output processing program which is performed asynchronously with said renewal processing programs, said output processing program including a file outputting section for storing an output execution status as said output status in said output status field of said copied buffer information field on said buffer control table and outputting contents of said copies buffer area into said filed device when said output processing program receives said output request dequeued from said output request waiting queue, and an output completion information section for storing an output completion status as said output status in said output status field of said copies buffer information field on said buffer control table and for storing said file output result status in said file output result status field of said copies buffer information field on said buffer control table after completion of a file output processing by means of said file outputting section, wherein said buffer control table further controls an alternate copied buffer area into which contents of said renewed buffer are should be copied in place of said copied buffer areas, said buffer control table further including an alternate copied buffer information field for storing alternate copied buffer information for said alternate copied buffer area, said alternate copied buffer information field including another area information field for said alternate copied buffer area, another output status field for storing another output status, another file output result status field for storing another file output result status, and another renewal processing program identifier field for storing another renewal processing program identifier identifying one of said renewal processing programs, each of said renewal processing programs further including an alternate copied buffer area securing section for checking said buffer control table to determine whether or not said alternate copied buffer area information field is secured in said buffer control table when said output execution status is stored in said output status field of said copied buffer information field on said buffer control table, said alternate copied buffer area securing section securing said alternate copied buffer area and storing said alternate copied buffer information in said alternate copied buffer information field of said buffer control table when said alternate copied buffer area is not secured in said system shared buffer unit, said alternate copied buffer area securing section checking said output status field of said alternate copied buffer information field when said alternate copied buffer area is already secured in said system shared buffer unit, said alternate copied buffer area securing section securing said alternate copied buffer area and storing said alternate copied buffer information in said alternate copied buffer information field of said buffer control table when said output execution status is stored in said output status field of said alternate copied buffer information field on said buffer control table.

2. A buffer asynchronous output apparatus as claimed in claim 1, wherein said output processing program further comprises an output request re-enqueuing section for enqueuing said output request in said output request waiting queue again when said output execution status is stored in said output status field of said copied buffer information field.

3. A buffer asynchronous output apparatus as claimed in claim 1, wherein each of said renewal processing program further comprises:

a copied buffer area releasing section for releasing said copied buffer area, exchanging said copied buffer information and said alternate copied buffer information, and then cancelling said alternate copied buffer information in said alternate copied buffer information field when said alternate copied buffer information is present in said alternate copied buffer information field on said buffer control table, said copied buffer area releasing section releasing said copied buffer area and cancelling said copied buffer information in said copied buffer information field on said buffer control table when said alternate copied buffer information is absent in said alternate copied buffer information field on said buffer control table and when said file output processing normally ends; and a file output checking section, on ending of each of said renewal processing programs, for judging whether or not said file output result normally ends by checking said file output result status field after waiting for output completion for all of said copied buffer area and said alternate copied buffer area which corresponds to said renewed buffer area when said copied buffer area or said alternate copied buffer area is present.

4. A buffer asynchronous output apparatus as claimed in claim 1, wherein each of said renewal processing program further comprises:

a copied buffer area releasing section for storing a releasable status as said output status in said output status field of said copied buffer information field or in said output status of said alternate copied buffer information field when said copied buffer area or said alternate copied buffer area can be released, said copied buffer area releasing section changing said copied buffer information and said alternate copied buffer information on said buffer control table to exchange said alternate copied buffer area for said copied buffer area.

* * * * *